Sept. 30, 1952 W. A. ROBERTS ET AL 2,611,927
METHOD FOR RESTORING RECORDS
Filed Aug. 22, 1949 3 Sheets-Sheet 1

INVENTORS
WILLARD A. ROBERTS,
FRANK L. MOORE AND
EMILE D. CONFORTI
BY Raymond W Cotton
ATTORNEY

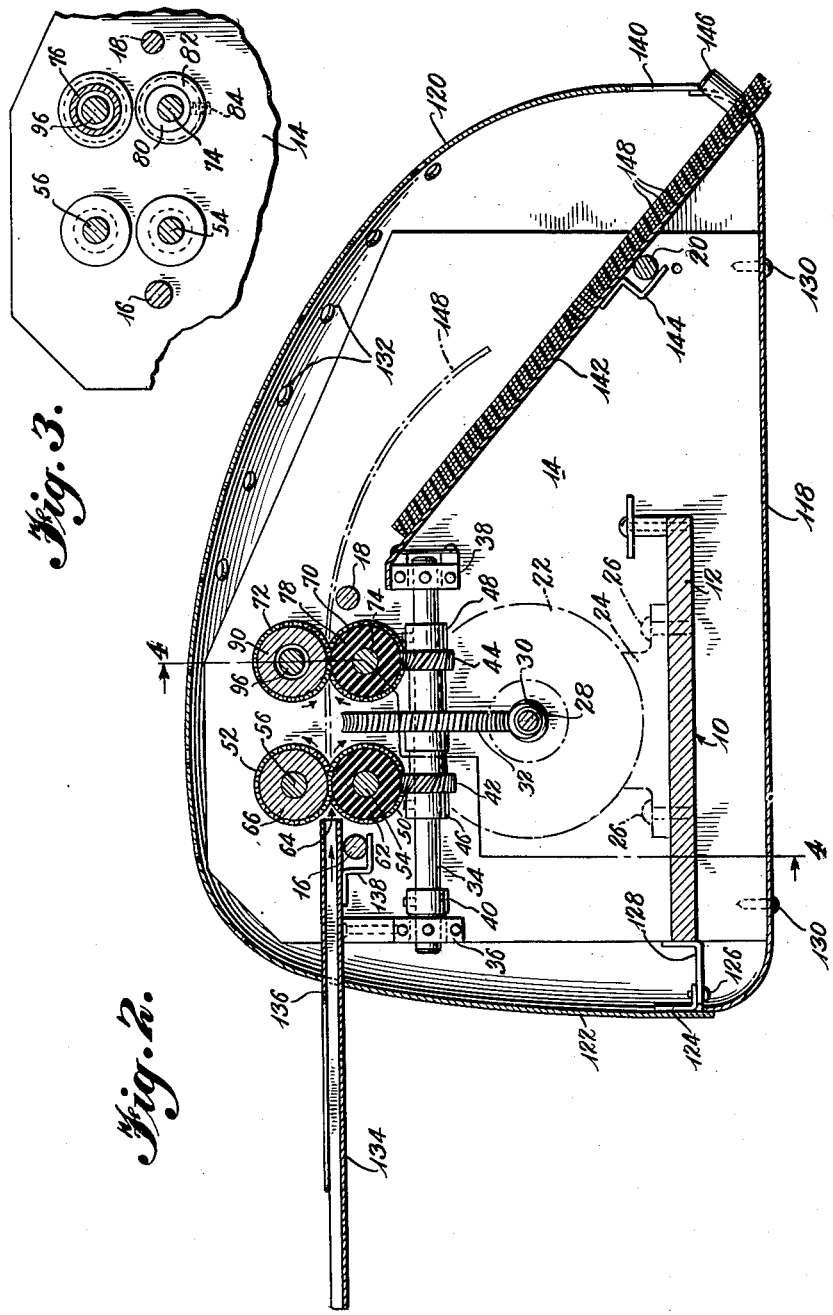

INVENTORS
WILLARD A. ROBERTS,
FRANK L. MOORE AND
EMILE D. CONFORTI

BY Raymond W Cotten
ATTORNEY

Patented Sept. 30, 1952

2,611,927

UNITED STATES PATENT OFFICE 2,611,927

METHOD FOR RESTORING RECORDS

Willard A. Roberts, Wethersfield, Frank L. Moore, Newington, and Emile D. Conforti, West Hartford, Conn., assignors to The Gray Manufacturing Company, a corporation of Connecticut Application August 22, 1949, Serial No. 111,724

6 Claims. (Cl. 18—48.3)

This invention relates to the restoration of the surfaces of embossed sound records.

The increasing use of flexible thermoplastic sound records, particularly in the office dictation field, has given rise to a demand for satisfactory resurfacing methods and apparatus. The known techniques for resurfacing records of the wax type are entirely unsuited to the problems encountered with these more recently developed thin materials. It has been the practice with records of the wax type, to engrave their surfaces during the recording operation and then renew the surfaces by a shaving or melting operation, both of which result in a reduction of the thickness of the tablet. The more recently adopted flexible types of records are originally quite thin and any appreciable reduction of their thickness would render them useless for repeated recording operations.

A number of attempts have been made by others to solve the problems attending the repeated restoration of thin flexible thermoplastic record surfaces, but they have been unsatisfactory for one or more reasons, including, the requirement for excessive manual handling of the records, the undue length of time consumed in performing the operation, the need for applying external forces to preserve the general shape of the record, the inability to prevent distortion and warping, and the retention of sufficient modulation from a preceding recording to produce objectionable interference when reproducing a subsequent recording.

The desired results have been achieved by the present invention, whose objects include a method of restoring the surface of an embossed thin flexible thermoplastic sound record comprising subjecting an embossed surface of the record to a plasticizing temperature for a short time, restricting penetration of the temperature to a limited depth and substantially eliminating grooves from the surface, and maintaining a portion of the record beyond such depth at a temperature below the plasticizing temperature of the record. The application of heat to the embossed surface is preferably accomplished conductively by relatively advancing the record into contact with a heated metal roll, and simultaneously submitting the opposed surface of the record to pressure imposed by a yieldable resilient roll having poor conducting properties, such as natural or synthetic rubber. Whereas the depth of penetration of the plasticizing temperatures may vary, according to the embodiment selected for illustration of this invention, the opposed surface of the record will be maintained below such plasticizing temperature. Where opposed surfaces of a record have been embossed, both surfaces can be restored according to the method contemplated herein. The relative movement of the record through the heated zone is preferably rapid to prevent such plasticization of the record throughout its thickness as would produce permanent distortion of the material.

The apparatus contemplated by the objects of this invention for resurfacing a grooved flexible thermoplastic sound record comprises a frame, a heater mounted in the frame, means connecting the heater with a source of energy to produce an operating temperature exceeding the plastic point of the record, and driving means carried by the frame sequentially moving the heater and record towards one another to plasticize proximate portions of the record and relatively apart before remote portions of the record become plastic. A roll rotatably mounted in the frame may be rotated by suitable driving means and may receive a heating element to maintain its temperature at the value required. Such a heater roll is preferably metal, sufficiently well polished to produce high conductivity and an adequate smoothing action. A pressure roll of yieldable resilient material such as natural or synthetic rubber, preferably defines a bight with the heater roll, into which a record is advanced. Proximate portions of these rolls are spaced by a distance less than the minimum thickness of a record to be resurfaced, requiring deformation of the pressure roll to assure contact between the heater roll and the entire surface of the record. The spacing between these rolls may be adjusted to compensate for tolerances in the parts of the apparatus or in the record material.

The apparatus also contemplates feed rolls having surface speeds which are equal to one another and likewise equal to the surface speeds of the finishing rolls (heater roll and pressure roll), so that the record will assume the speed of the finishing rolls before entering their bight and will not be buckled or stretched by the operation, and such excessive time of contact will be avoided as to prevent damage therefrom to either the heater roll or the record. All of these rolls may have a common driving means to assure their synchronous movement, and as in the case of the finishing rolls, one of the feed or friction rolls may be metallic and the other composed of yieldable resilient material such as natural or synthetic rubber.

A more complete understanding of the invention will be implemented by a detailed description of the accompanying drawings wherein:

Fig. 2 is an elevation taken along line 2—2 of Fig. 1;

Fig. 3 is a fragmentary elevation taken along line 3—3 of Fig. 1;

Figure 1:
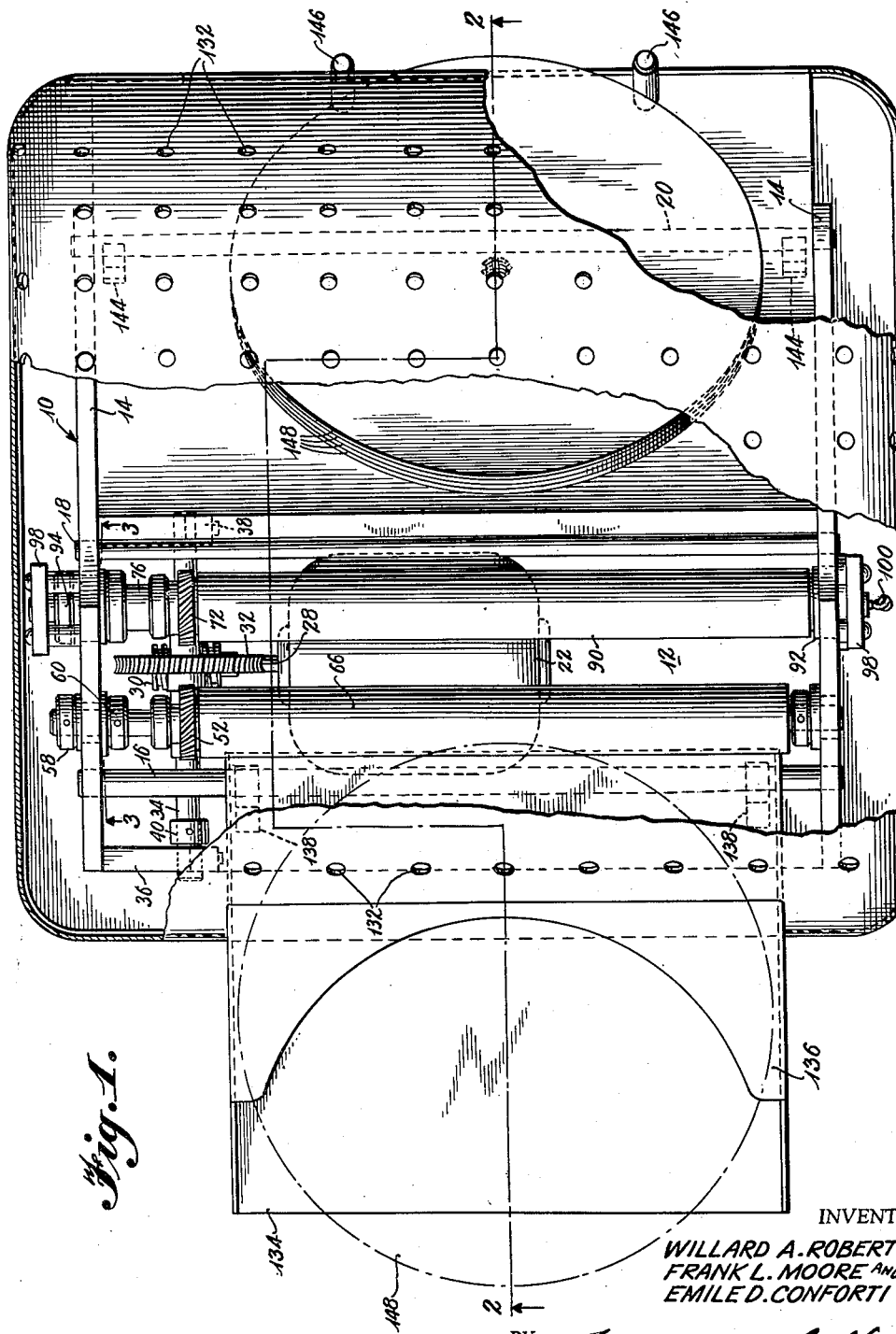
Fig. 1 is a plan view of apparatus contemplated by the present invention, with the housing partially broken away.
Figure 4:
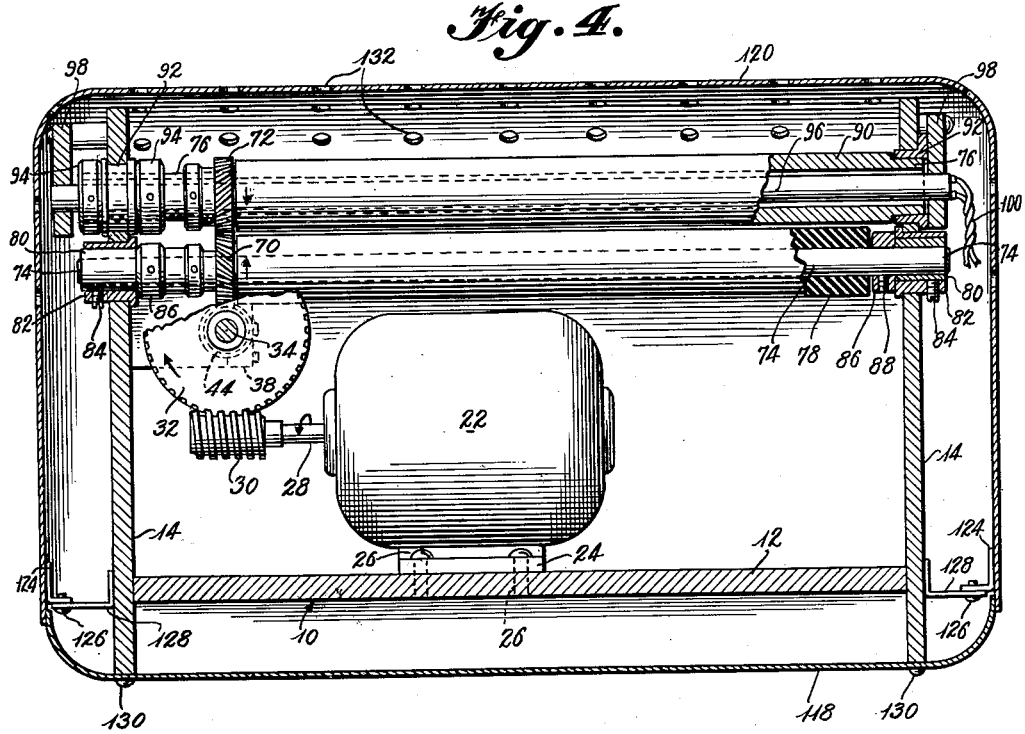
Fig. 4 is an elevation taken along line 4—4 of Fig. 2.
Figure 5:
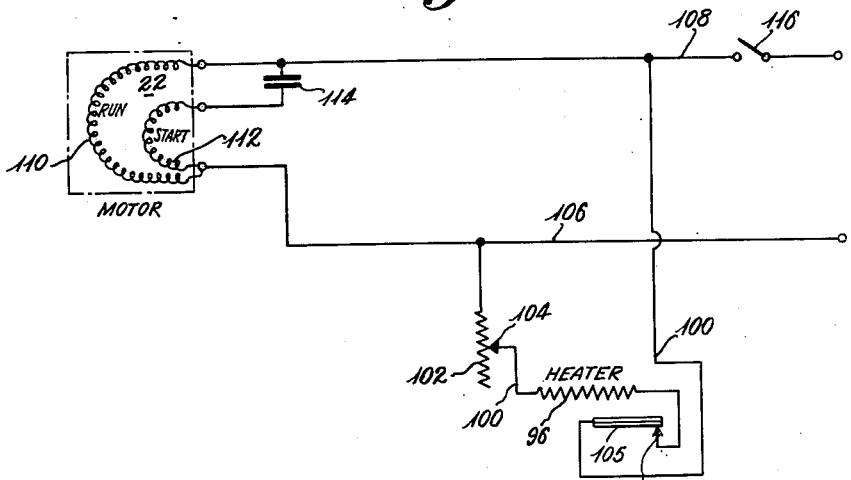
Fig. 5 is a circuit diagram depicting the electrical connections used in the apparatus of the preceding figures.

The frame 10 of the apparatus shown in the drawings, includes a base plate 12 suitable secured to a pair of vertical side plates 14, and a plurality of transverse bracing rods 16, 18 and 20 extending between the side plates and secured at their ends thereto.

An electric motor 22 has its base 24 attached to the base plate 12 by means of screws 26, the motor shaft 28 having a worm 30 fastened thereto. The worm is maintained in driving engagement with the teeth of a worm gear 32, fixed to a shaft 34 whose ends are journaled in brackets 36 and 38 carried by one of the side plates 14. A spacing collar 40 is adjustable along the shaft 34 to permit the proper amount of end play. Also secured to the shaft 34 are a pair of similar helical gears 42 and 44, maintained in properly spaced relationship by means of suitable collars 46 and 48 respectively.

The helical gear 42 shown at the left of Fig. 2 meshes with a complementary helical gear 50 which in turn meshes with a helical gear 52 of equal size. The helical gears 50 and 52 are fixed to transverse shafts 54 and 56 respectively which shafts are journaled in the side plates 14 and maintained in their correct axial positions by means of adjustable collars 58 and 60. The lower shaft 54 is fitted with a flexible resilient roll 62 composed of natural or synthetic rubber or the like, forming a bight 64 with a metal roll 66 fixed to the upper shaft 56. The two rolls 62 and 66 constitute the positively driven frictional feed rolls for the apparatus, and are maintained in such spaced relationship as will assure uniform advancement of the record material introduced into their bight.

The helical gear 44, carried by the shaft 34, meshes with a helical gear 70 which in turn meshes with a helical gear 72 of equal size and equal in size to the helical gears 50 and 52. The helical gear 70 is secured to a transverse shaft 74 which is adjustably journaled in the side plates 14, while the helical gear 72 is secured to a hollow shaft 76 which is received by fixed bearings carried by the side plates 14. The shaft 74 drives a flexible resilient roll 78 of natural or synthetic rubber or the like secured thereto, which is substantially the same in size and composition as the feed roll 62. The ends of the shaft 74 are received in eccentric bearings 80 which are in turn received in complementary bushings 82 to which they are adjustably secured by means of set screws 84. Suitable spacing collars 86 maintain the shaft in its desired axial position by means of their set screws 88.

The hollow shaft 76 may be formed as a reduction of the heater roll 90, the reduced ends being extended through bearings 92 carried by the side walls 14 and positioned with respect thereto by means of collars 94. An electrical heating element 96 is received within the hollow roll 90, having its ends supported by brackets 98 secured to the side plates 14 as shown, but rotation of the heating element with the roll may be effected if desired. Energy is supplied to the heating element through leads 100, one of which is connected through a rheostat 102 and its adjustable tap 104 to a line conductor 106, and the other of which is connected through a thermostat 105 and its terminal 107 to a line conductor 108. The running winding 110 of the motor 22 is connected directly across the line conductors 106 and 108, and its starting winding 112 is connected across these conductors through a capacitor 114. A single switch 116 in the line conductor 108 can serve to energize both the driving motor and the heating element. Where the heating element rotates with its roll, slip rings and brushes can be employed to complete its circuit.

The apparatus has been depicted as received within a housing having a base 118 and a cover 120. The cover has a depending skirt 122, near the lower edge of the inner surface of which a plurality of angles 124 are secured for supporting and fastening the cover by means of screws 126 to cooperating angles 128 secured to the frame. After the cover has been installed, the base 18 is secured to the side walls 14 of the frame by means of screws 130. The cover is ventilated by means of apertures 132 to prevent an undue rise of the general temperature within the housing.

A feed table 134, as shown in Fig. 2 penetrates the upper left hand portion of the housing substantially in the horizontal plane of the bight 64 defined by the feed rolls. An arcuately notched guard 136 partially overlies the table 134 with which it cooperates to guide the record material into the bight 64. The table and guard may be constructed from sheet material and jointly supported by the housing cover 120 and the transverse bracing rod 16 received between the lower surface of the table and a flanged bracket 138 secured to the table.

The base and cover contain complementary notches at their lower right hand portions as viewed in Fig. 2, to define a delivery slot 140 through which processed records can be removed. A ramp or delivery table 142 is secured at its upper edge to the bracket 38, and at an intermediate portion rests upon the transverse bracing rod 20 which is received between the lower surface of the ramp and a flanged bracket 144 secured to the ramp. A pair of stop pins 146 are secured to opposite sides of the ramp near its lower edge, serving to limit the descent of the processed records as they fall upon the ramp, yet permitting ready removal of the records by an attendant who can merely lift the records over the tops of the pins and withdraw them.

Operation of the apparatus depicted in the drawing is initiated by closing the switch 116, whereupon the heating element 96 is energized and the motor 22 assumes its running speed. As soon as the heater roll 90 attains a surface temperature corresponding to the setting of the rheostat 102 for the record composition, linear speed, and roll characteristics employed, the embossed thin flexible thermoplastic sound records 148 can be fed, one at a time, between the feed table 134 and its guard 136 into the bight 64 between the feed rolls 62 and 66. These rolls are driven at equal surface speeds which are also equal to the surface speeds of the finishing rolls 78 and 90, thus assuring that the records advancing into the bight formed by the finishing rolls will be travelling at the exact surface speed necessary to avoid buckling or stretching of the records. As a further precaution in this behalf, it will be observed that both of the upper rolls 66 and 90 are metallic and that both of the lower rolls 62 and 78 have deformable poorly conductive surfaces of natural or synthetic rubber or the like, so that the driving forces imposed by the two pairs of rolls upon the record will be substantially equal.

As the record passes between the finishing rolls, the pressure roll 78, due to its predetermined spacing and resiliency, maintains a constantly changing narrow portion of the record in contact at a substantially uniform pressure with the heater roll 90, the temperature and speed having been so selected that the embossed surface of the record in contact with the heater roll has its temperature elevated to plasticize the material to a limited depth less than the entire thickness of the record. The record is discharged from the finishing rolls with sufficient speed to preclude a temperature rise through the entire depth or thickness of the record sufficient to effect plasticization beyond the desired depth. Hence, the record will retain its desired unwarped, unbuckled form. Should the temperaure of the roll 90 exceed its predetermined maximum value, the thermostat 105 will warp and break the heater circuit until proper temperature conditions are restored. The record 148 is depicted by broken lines in Fig. 2 is somewhat bowed due to the cantilever effect of its own weight, but after it has been released by the finishing rolls to assume its place upon the ramp 142, its previous surface properties as well as its resilience and flexibility appear to be completely restored.

After a record has had one of its surfaces restored in this way, it can be removed from the ramp, inverted and passed through the apparatus a second time for restoration of its opposite surface. The records can be fed into the apparatus as rapidly as the roll speed will permit, and since they are automatically ejected from the heating zone to the ramp, there is no need for manual removal of each record before the next one is introduced.

Whereas the method and apparatus contemplated by this invention are subject to variation depending upon the properties of the record material, the roll sizes and materials, the rate of heat dissipation to atmosphere and surrounding bodies, and other factors, a presentation of specific values employed successfully in one application of the invention may be useful to those skilled in the art.

In restoring the surfaces of "Vinylite" disc records having a thickness of 0.010 in. plus or minus 0.001 in., the following values have produced highly satisfactory results:

Surface temperature of heater roll, 240° to 250° F.
Distance between heater roll and pressure roll, 0.004 in.
Roll diameters, 1.0 in.
Roll speeds, 29 R. P. M.

Composition of pressure roll, 50 to 55 durometer neoprene sleeve on a metal core having a diameter of 0.5 in.

Under these conditions, the arc of contact between the record material and the heater roll is approximately $\frac{3}{32}$ in., the computed maximum pressure on the record is about 20 lb. per sq. in., and the time during which heat is applied approximates 0.06 sec. It will be evident that the use of a yieldable or deformable pressure roll provides a greater arc of contact than would be present were a rigid pressure roll substituted, and moreover, the deformable characteristic inherently compensates for variations in record thicknesses.

From these data, it has been computed that with a contact time of 0.06 sec., and a room temperature of 68° F., the temperature of the record at a depth of 3.8 mils from the surface under treatment rises to 142° F., which corresponds to the "heat distortion temperature" at a pressure of 264 lb. per sq. in. as set forth in the "Technical Data" published in connection with "Vinylite." Since the pressure here involved is less than one-tenth of that required to produce distortion at 142° F., it will follow that the record fails to attain a plastic condition at a depth of 3.8 mils and it can be almost certainly stated that such a temperature will never penetrate beyond one-half the record thickness.

The principles underlying the present invention have been variously expounded. One theory deals with the presence of internal stresses introduced into the plastic record during its manufacture and the introduction of further internal stresses during the embossing operation which occurs under the action of a recording stylus. According to this hypothesis, when a record is subjected to the operations contemplated herein, the internal stresses produced by embossing are released by the application of a plasticizing temperature causing the surface to flow to its initial unembossed form, while the internal stresses remote from the heated surface retain the record in its initial form, preventing any over-all distortion or warping.

By plasticizing temperature as employed in the accompanying claims, is intended that temperature at which the record material will flow under the applied pressure.

Whereas only one form of apparatus has been illustrated in describing the invention, many variations will occur to those skilled in the art. And it is intended that the invention should not be confined to such apparatus, or to any numerical values or theories appearing in the discussion, beyond the scope of the appended claims.

We claim:

1. A method of restoring the surface of an embossed thin flexible thermoplastic sound record containing grooves comprising subjecting an embossed surface of said record to pressure and to a temperature thermostatically maintained above the minimum plasticizing temperature of the record material, and correlating the duration of such applied temperature with said temperature to apply heat to said surface sufficiently to plasticize the record only to a depth comparable with the depth of said grooves so as to eliminate the surface grooves of said record and restore said surface to substantially its initial unembossed form without deforming the record as a whole and without the loss of material from said surface.

2. A method of restoring the surface of an embossed thin flexible thermoplastic sound record comprising heating an embossed surface of said record by physical contact to a temperature exceeding the plasticizing temperature of said record and correlating the time of contact with said temperature to apply heat to said surface sufficiently to plasticize said record to less than its entire thickness but at least to its embossed depth and restore said surface to substantially its original unembossed form, and terminating the heating effect prior to the loss of material from said 3. A method of restoring the surface of an embossed thin flexible thermoplastic sound record comprising applying pressure and heating an embossed surface of said record by physical contact to a temperature exceeding the plasticizing temperature of said record and correlating the time of contact with said temperature to apply heat to said surface sufficiently to plasticize said record to less than its entire thickness but at least to its embossed depth and restore said surface to substantially its original unembossed form, and terminating the heating effect prior to the loss of material from said surface and while said record remains self supporting.

4. A method of restoring the surfaces of an embossed thin flexible thermoplastic sound record comprising heating opposed embossed surfaces of said record by physical contact to a temperature exceeding the plasticizing temperature of said record and correlating the time of contact with said temperature to apply heat to said surfaces sufficiently to plasticize said record at least to its embossed depth and restore said record to substantially its original thickness, and terminating the heating effect while said record remains self supporting.

5. A method of restoring the surface of an embossed thin flexible thermoplastic sound record comprising progressively advancing said record through a heated zone, heating an embossed surface of said advancing record by physical contact to a temperature exceeding the plasticizing temperature of said record and correlating the time of contact with said temperature to apply heat to said surface sufficiently to plasticize said record to less than its entire thickness but at least to its embossed depth and restore said surface to substantially is original unembossed form, and terminating the heating effect prior to the loss of material from said surface and while said record remains self supporting.

6. A method of restoring the surface of an embossed thin flexible thermoplastic sound record comprising heating said record by rotary engagement with said surface to a temperature exceeding the plasticizing temperature of said record and correlating the time of contact with said temperature in order to produce a temperature differential depthwise of said record ranging from a plasticizing temperature at said embossed surface to a value lower than said plasticizing temperature at an intermediate depth of said record, and terminating the heating effect prior to the loss of material from said surface.

WILLARD A. ROBERTS.
FRANK L. MOORE.
EMILE D. CONFORTI.

REFERENCES CITED

The following references are of record in the file of this patent:

UNITED STATES PATENTS

| Number | Name | Date |
|---|---|---|
| 727,229 | Turner | May 5, 1903 |
| 1,461,252 | Moyle | July 10, 1923 |
| 1,476,507 | Hails | Dec. 4, 1923 |
| 2,265,032 | Fayrer | Dec. 2, 1941 |
| 2,340,161 | Van Deventer | Jan. 25, 1944 |
| 2,397,608 | Johnson | Apr. 2, 1946 |
| 2,551,005 | Johnson | May 1, 1951 |